United States Patent [19]

Bergsten et al.

[11] Patent Number: 5,386,706
[45] Date of Patent: Feb. 7, 1995

[54] LOW HEAT-LEAK, COHERENT-AEROGEL, CRYOGENIC SYSTEM

[75] Inventors: Victor E. Bergsten, East Amherst; John Notaro, West Seneca; Richard B. Mazzarella, Grand Island; Christian F. Gottzmann, Clarence, all of N.Y.

[73] Assignee: Praxair Technology, Inc., Danbury, Conn.

[21] Appl. No.: 74,766

[22] Filed: Jun. 10, 1993

[51] Int. Cl.$^6$ .............................................. F17C 1/00
[52] U.S. Cl. ..................................... 62/45.1; 220/421; 220/DIG. 9
[58] Field of Search ................. 62/45.1, 54.1; 220/421, 220/DIG. 9

[56] References Cited

U.S. PATENT DOCUMENTS

| | | | |
|---|---|---|---|
| 3,118,194 | 1/1964 | Biais | 62/45.1 |
| 3,130,561 | 4/1964 | Hnilicka, Jr. | 62/45.1 |
| 3,147,877 | 9/1964 | Beckman | 62/45.1 |
| 3,993,213 | 11/1976 | Burge et al. | 62/45.1 |
| 4,399,175 | 8/1983 | Kummermehr et al. | 428/76 |
| 4,402,927 | 9/1983 | von Dardel et al. | 423/335 |
| 4,447,345 | 4/1984 | Kummermehr et al. | 252/62 |
| 4,564,547 | 1/1986 | Hughes | 428/117 |
| 5,027,574 | 7/1991 | Phillip | 52/171 |
| 5,037,859 | 8/1991 | Williams, Jr. et al. | 521/55 |
| 5,086,085 | 2/1992 | Pekala | 521/187 |
| 5,092,101 | 3/1992 | Kunert | 52/789 |

FOREIGN PATENT DOCUMENTS 1288313 4/1991 Canada.

OTHER PUBLICATIONS

Futuretech, No. 105, May 14, 1990, 17 pp.
Potter et al., "Non-CFC Vacuum Alternatives for the Energy-Efficient Insulation of Household Refrigerators: Design and Use" Preprint of article for Proceedings, 42nd International Applicance Technical Conference, Madison, Wis., May 1991, pp. 1-13.

Primary Examiner—Ronald C. Capossela
Attorney, Agent, or Firm—Peter Kent; Chung K. Pak

[57] ABSTRACT

A low heat-leak cryogenic system comprising a cryogenic fluid, a first lamina having an external side facing toward and exposed directly to, or indirectly to, the cryogenic fluid and an internal side facing away from the cryogenic fluid; a second lamina spaced apart from the first lamina, and at least one block or layer of coherent aerogel extending from the first lamina to the second lamina. In another version, the aerogel is in a gaseous environment having a pressure not greater than 250,000 micrometers of mercury. In another version, at least one of the lamina is flexible so as to at least partially transmit an external load, such as that imposed by the atmosphere, to the coherent aerogel, and the coherent+ aerogel is capable of at least partially transmitting a load imposed on it from one lamina to the other.

20 Claims, 2 Drawing Sheets

LOW HEAT-LEAK, COHERENT-AEROGEL, CRYOGENIC SYSTEM

BACKGROUND

This invention relates to a low heat-leak system for containing or guiding fluids at cryogenic temperatures.

In the containment or guidance of fluids at cryogenic temperatures, namely, cryogenic fluids, it is important to provide a system that will have a very low rate of heat transmission, that is, heat leak from the surface exposed to ambient atmosphere to the surface exposed to the fluid at cryogenic temperature. Because of the large temperature difference, the thermal driving potential is very high. Heat leak into a fluid at cryogenic temperature is particularly costly and undesirable because of the large amount of work required in achieving the cryogenic temperature, particularly, in liquefying a gas to form a fluid at cryogenic temperature.

The cryogenic temperature range has been identified in publications, and as is used herein extends from 0K. to about 172K. Insulative systems that perform satisfactorily at temperatures above cryogenic temperatures usually do not perform satisfactorily at cryogenic temperatures. At temperatures below the freezing temperature of water, insulative systems have low internal vapor pressure, which creates high potential for atmospheric moisture to enter the system and impair the insulative quality of a system.

In systems for containing or guiding fluids at cryogenic temperatures, heat leak is usually decreased by providing a space of reduced gaseous pressure, that is, a space evacuated of air or gas to some degree to reduce heat transmission by gaseous conduction. The structure necessary varies with the subatmospheric pressure in the space or degree of evacuation. Higher degrees of evacuation require stronger and thicker walls and structures to support the pressure differential between the evacuated space and the ambient atmosphere.

To reduce heat transmission by radiation, the space usually is filled at least in part with radiation shields, a powder or a matrix of solids and voids. A high degree of evacuation is still typically necessary to achieve tolerable rates of heat transmission across the space. The matrix or powder usually contributes somewhat to the heat transmission rate across the space by conduction through the solid portion of the matrix or powder.

What is needed is a system for containing or guiding fluids at cryogenic temperatures wherein low heat leak is attained without a high degree of evacuation and without a high strength structure. This invention satisfies these needs. The invention employs a coherent aerogel to achieve low rates of heat transmission, preferably with gaseous environment pressures higher than used with other materials in the prior art. The coherent aerogel is in a fixed form capable of bearing and transmitting load so that the structure surrounding the aerogel preferably need not support fully the pressure loading imposed by the ambient atmosphere, but can transmit the pressure loading from one external face of the enclosure, through the aerogel, to the other face of the enclosure, thereby balancing the pressure loading of the ambient atmosphere.

Aerogels are water-free gels dried in such a way that the solid matter in the gel remains intact. The resulting solid is an amorphous lattice structure with ultrafine open cells typically consisting of 1 to 5% solid matter. Aerogels have continuous porosity and a microstructure of interconnected colloidal-like particles or polymeric chains with characteristic diameters of 0.01 micrometers. Abundant pores of nanometer size through out the aerogel comprise most of the aerogel's volume.

Inorganic aerogels which have been prepared in coherent form include silica, alumina, zirconia, tungsten, and titanium aerogels, made via the hydrolysis and condensation of the metal alkoxide, for example, tetramethoxy silane, in an alcohol to form an alcogel. The alcogel is dried at supercritical conditions for the alcohol, or at supercritical conditions for a solvent substituted for the alcohol, so as to form a coherent matrix, that is, a coherent aerogel. Alternatively, the alcohol may be replaced with a solvent which is extracted at supercritical conditions for the solvent. Coherent aerogel based on carbon has also been prepared.

Organic aerogels include resorcinol-formaldehyde aerogels formed by the sol-gel polymerization of resorcinol with formaldehyde under alkaline conditions. A typical process is described in U.S. Pat. No. 4,402,927 issued Sep. 6, 1983 to G. von Dardel, hereby incorporated by reference. Another organic aerogel is produced by the sol-gel polymerization of melamine with formaldehyde, introducing a PH change, and following with supercritical extraction, as described in U.S. Pat. No. 5,086,085 issued Feb. 5, 1992 to R. W. Pekala, and hereby incorporated by reference. Representative densities are from about 100 to about 800 kilograms per cubic meter.

All of the aerogels mentioned are capable of being produced in a coherent form, are capable of compressive load bearing, have low densities and display low transmission of heat at atmospheric pressure, and at subatmospheric pressures, notably at low vacuum.

SUMMARY

This invention provides a low heat-leak cryogenic system comprising:

(a) a cryogenic fluid;

(b) a first lamina having an external side facing, and exposed directly to, or indirectly to, the cryogenic fluid, and an internal side facing away from the cryogenic fluid;

(c) a second lamina spaced apart from the internal side of the first lamina, the second lamina having an internal side facing toward the first lamina and an external side facing away from the first lamina; and (d) at least one layer of coherent aerogel extending from the internal side of the first lamina to the internal side of the second lamina.

In another version, the invention further comprises about the coherent aerogel a gaseous environment having a pressure of from about 2000 to about 100,000 micrometers of mercury.

In still another version of the invention, at least one of the lamina are flexible so as to at least partially transmit an external load, such as that imposed by the atmosphere, to the coherent aerogel, and the coherent aerogel is capable of at least partially transmitting a load imposed on it from one lamina to the other.

DRAWINGS

Figure 5:
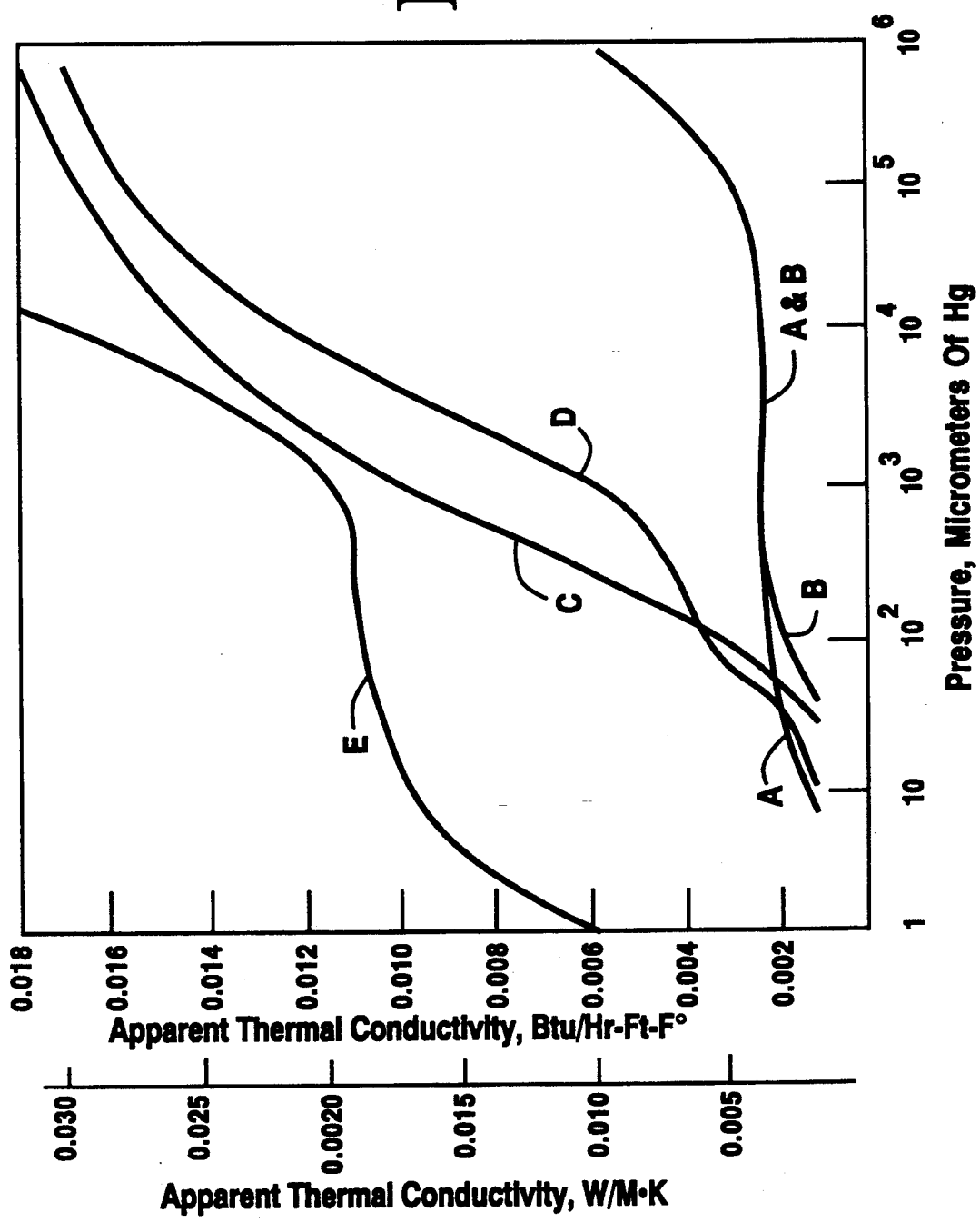

FIG. 5 is a graph of apparent thermal conductivity of several materials in an environment of air at various pressures between two surfaces respectively at temperatures of 295K. and 77K. Curve A is for coherent silica aerogel as measured on two contiguous layers, each 1.27 cm thick and having a density of 96 kilograms per cubic meter. Curve B is for coherent silica aerogel as measured on two similar contiguous layers with a reflective aluminum foil on each of the two outside surfaces of the two layers and a reflective foil between the two layers. Curve C is for perlite powder at a bulk density of 88 kilograms per cubic meter. Curve D is for fiberglass with a bulk density of 16 kilograms per cubic meter, manufactured by Owens-Corning and designated as PF-210. Curve E is for air calculated including convective effects between two surfaces 2.54 cm apart, each with an emissivity of 0.074.

DESCRIPTION

Figure 1:
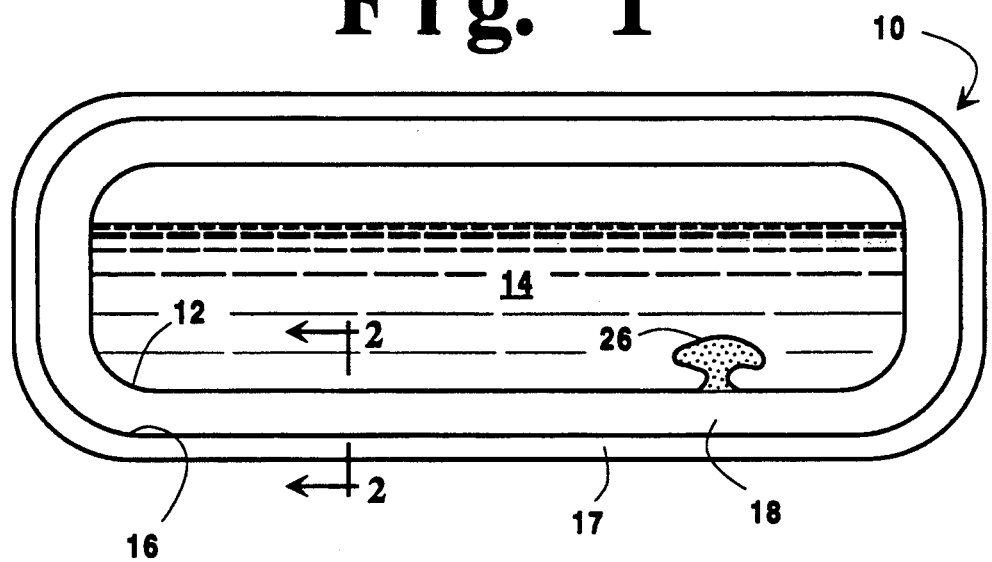
FIG. 1 is a sectional drawing of a cryogenic fluid container to which the present invention has been applied.

The invention will be described as applied to a storage container for cryogenic fluid as depicted in FIG. 1. The invention can be similarly applied to other vessels, confinements or conduits for cryogenic fluids. The storage container 10 has a first lamina 12 having an external side facing toward, and an internal side facing away from, the cryogenic fluid 14. Usually the first lamina 12 is exposed directly to the cryogenic fluid, that is, in contact with the fluid and serving to contain the fluid. Typically the first lamina is comprised of metal sheet, is impervious to the cryogenic fluid, and is capable of withstanding the loads imposed by the fluid. Alternatively the first lamina may be exposed indirectly to the fluid, that is, the external side of the first lamina may be in contact with another surface (not shown) which itself is in direct contact with the cryogenic fluid and serves to contain the fluid. When the container contains fluid at cryogenic temperature, the first lamina approaches the temperature of the cryogenic fluid.

Spaced from the internal side of the first lamina 12 is a second lamina 16 having an internal side facing the internal side of the first lamina 12 and an external side facing away from the first lamina 12. Typically the external side of the second lamina 16 is directly exposed to the ambient atmosphere. Optionally a protective coating 17 may be provided on the external side of the second lamina to guard against physical damage and optionally to also retard the heat leak rate. Suitable materials include organic foams such as, for example, polystyrene or polyurethene foam. Extending from the internal side of the first lamina 12 to the internal side of the second lamina 16, that is, occupying the space therebetween, is at least one block or layer of coherent aerogel. Multiple layers, blocks, bricks, mating pieces, or random pieces may be employed. The first lamina and the second lamina can be made to serve the multiple purposes of encapsulating the coherent aerogel to provide a closed chamber which may be evacuated of air or other gas and to protect the coherent aerogel during handling. While the invention is applicable to aerogels in general, silica aerogel is preferred because its base, silicon dioxide, has a tetrahedral structure conducive to forming strong molecular bonds and is nonflammable.

Coherent silica aerogel has a density of from about 20 to about 160 kilograms per cubic meter, preferably from about 60 to about 100 kilograms per cubic meter for use in the system provided by this invention. The average pore size ranges from about from about 0.01 to about 0.4 micrometers, preferably from about 0.02 to about 0.1 micrometers. Larger pore size typically corresponds with lower density. Pore size as used herein means the average distance between walls in the voids in the coherent material.

Figure 2:
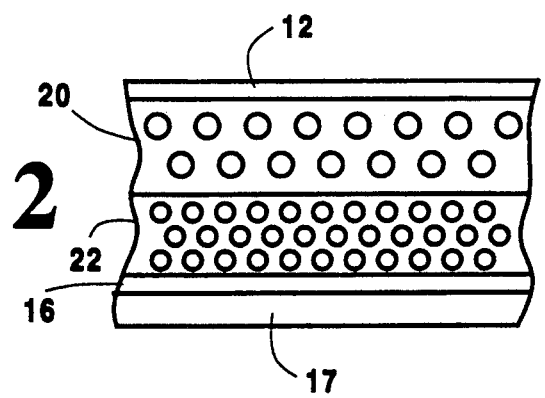
FIG. 2 is cross-sectional view at line 2—2 of the container of FIG. 1 pursuant to one version of the invention.

Coherent aerogel may be used in layers of different pore size and density in a single low-heat-leak system for a cryogenic installation. When the system is in cryogenic service, the mean free path of gas molecules comprising the gaseous environment within the system proximate the colder surface of the system is longer than that of gas molecules proximate the warmer surface of the system. Hence, similar or even lower apparent thermal conductivity may be obtained across coherent aerogel with a larger pore size proximate a colder surface in a system than that which may be obtained in coherent aerogel with a smaller pore size proximate a warmer surface in the system. To reduce the weight of aerogel material used in a given application, as depicted in FIG. 2, it is advantageous to use a lower density and larger pore size in a layer 20 or layers adjacent to the first lamina 12 where temperatures are colder, and to use a higher density and smaller pore size in a layer 22 or layers adjacent to the second lamina 16 where temperatures are warmer. System weight and cost may thus be reduced while maintaining low heat leak across the system.

Figure 3:
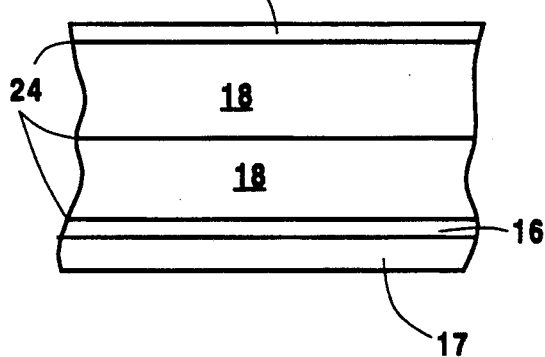
FIG. 3 is a cross-sectional view at line 2—2 of the container of FIG. 1 pursuant to another version of the invention.

As depicted in FIG. 3, to reduce heat transmission by radiation through coherent aerogel in a system, a radiation shield 24 of reflective foil, such as aluminum foil, may be employed between layers of aerogel and at the aerogel layer surfaces which face the first and second laminas. Optionally a reflective film may be applied to the surfaces of the coherent aerogel layers by chemical or vapor deposition. Optionally, to reduce transmission by radiation, opacifying reflective flakes (not shown), such as flakes of aluminum or copper, may be incorporated throughout the aerogel material during its formulation.

Advantageously, coherent aerogel is capable of bearing and transmitting applied external loads, particularly compressive loads. To improve the strength of the coherent aerogel, strengthening fibers may be incorporated in the aerogel during its formulation, such as fibers of metal, carbon or polyester. In the system provided by the invention, one or both lamina may be comprised of flexible material capable of supporting an applied external load by at least partially transmitting the load to the coherent aerogel, which, in turn, is capable of at least partially transmitting the load to the other lamina. If the other lamina does not support and contain the cryogenic fluid, then the load is further transmitted to a surface which may contact and support the other lamina and contain the cryogenic fluid. The flexible lamina may be light-gauge metal, lightweight material with a protective foam covering, or a plastic, preferably with fiber reinforcement. Desirably, the lamina are impervious to water vapor and other atmospheric gases.

Figure 4:
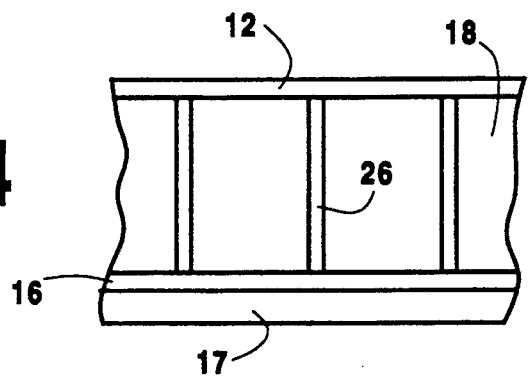
FIG. 4 is a cross-sectional view at line 2—2 of the container of FIG. 1 pursuant to another version of the invention.

To improve the capability of the coherent aerogel for bearing compressive loads, as depicted in FIG. 4, spaced apart, localized load supporting means such as supports 26 or struts can be provided to extend through the aerogel from the first lamina to the second lamina. Alternatively, the aerogel can be contained in cells (not shown), such as cells of hexagonal cross section, the walls of which extend from the first lamina to the second lamina. Alternatively, coherent aerogel, because of its load bearing capability may itself be employed as a localized load supporting means 26 between lamina which may otherwise contain unfilled space or space with insulative powder, such as perlite powder.

Shown in Table I are the values of apparent thermal conductivity measured at various subatmospheric pressures of coherent silica aerogel with a density of 96 kilograms per cubic meter, in two contiguous layers, each 1.27 cm thick, between surfaces maintained at temperatures indicated in the table. The coherent silica aerogel material was manufactured in accordance with the process described in Canadian Patent No. 1,288,313 issued Sep. 3, 1991 to A. J. Hunt et al., hereby incorporated by reference. The process includes the hydrolysis and polycondensation of silicon alkoxide in alcohol to give an alcogel. The alcohol is replaced by liquid carbon dioxide, and the alcogel is dried by extracting the carbon dioxide under supercritical conditions. The resulting material was determined to have an effective average pore size of about 0.04 micrometers from a correlation that relates gaseous conduction as a function of gas properties at room temperature, the gas pressure, and the pore size of the material. The density of the material was measured at about 96 kilograms per cubic meter. The load bearing capability of the material was assessed by subjecting a layer to a compressive load equal to that of standard atmospheric pressure. The material did not compress significantly, remained coherent, showed some crazing, and displayed the same thermal conductivity as before the loading.

FIG. 5 compares the apparent thermal conductivity of several materials as displayed from one face maintained at about 295K. to another at about 77K. Curve A is for the coherent silica aerogel material described above as measured on two contiguous layers, each 1.27 cm thick. Curve A shows that the apparent thermal conductivity of coherent silica aerogel in an air environment at standard atmospheric pressure of 760,000 micrometers of mercury is considerably less than that of competitive materials also at standard atmospheric pressure. The thermal conductivity of silica aerogel decreases rapidly as the pressure of the air environment enveloping the aerogel is decreased, so that at about 250,000 micrometers of mercury, the thermal conductivity has decreased to a value where it is competitive with that of perlite or fiberglass at much lower pressures and is preferred for use in low-heat-leak structures for cryogenic fluids. The thermal conductivity curve for silica aerogel begins to level out at about 100,000 micrometers of mercury. As the pressure is decreased from about 100,000 to about 100 micrometers mercury, curve A levels out to an almost constant value. Throughout this pressure range, curve A surprisingly shows a thermal conductivity which is lower than that of either perlite (curve C) or fiberglass (curve D) when either is at a pressure of 100 micrometers of mercury. Thus coherent silica aerogel at about 100,000 micrometers of mercury has a lower thermal conductivity, and can be used in a cryogenic system with lower heat leak, than a system with perlite or fiberglass at 100 micrometers of mercury. Coherent silica aerogel is preferable to perlite or fiberglass because its high insulative properties are achieved at higher pressures, that is, lesser vacuums, than required for perlite or fiberglass.

As shown in FIG. 5, at pressures from that of the standard atmosphere to pressures of about 30 micrometers of mercury, coherent silica aerogel has a lower thermal conductivity than perlite or fiberglass. However, at pressures less than 30 micrometers of mercury, the thermal conductivities of perlite and fiberglass are lower than that of coherent silica aerogel without radiation reducing means. Notwithstanding, at pressures less than 30 micrometers of mercury, coherent silica aerogel in two one-half-inch-thick layers, with reflective shielding on the surfaces of the layers, as shown by curve B, exhibits a lower thermal conductivity than fiberglass and perlite. Thus the cryogenic system provided by this invention wherein reflective shielding is used on the surfaces of layers of coherent silica aerogel in an environment of reduced pressures can provide lower heat leak than conventional systems, which utilize fiberglass or perlite.

Low heat leak from ambient atmosphere through the inventive system and into the cryogenic fluid, is attainable by providing for the coherent silica aerogel an air or other gaseous environment with a pressure less than about 100,000 micrometers of mercury. Ranges of pressure from about 300 to about 100,000 micrometers of mercury, from about 1000 to about 100,000 micrometers of mercury, and from about 10,000 to about 100,000 micrometers of mercury are particularly attractive because these higher pressures are easier to achieve and maintain. These higher pressure ranges are advantageous over conventional systems which typically use perlite or fiberglass under more reduced pressures. The invention allows considerable savings in construction cost and maintenance cost over conventional systems which have to operate at lower pressures (that is, at higher vacuums) to be equivalent and competitive in heat leak rate.

The apparent thermal conductivity behavior of silica aerogel as a function of gaseous environment pressure is expected to be similar for all aerogels, that is, all aerogels will display low thermal conductivity at higher subatmospheric pressures than conventional materials. Consequently aerogels in general are applicable in this invention as specifically described with respect to silica aerogel.

The ability of coherent aerogels to achieve low thermal conductivity at moderate reductions in pressure from normal atmospheric pressure, allows the development of such operable pressure levels by means other than a vacuum pump. Operable pressure levels may be achieved by condensation of gas in the aerogel environment by cooldown of the system structure by the cryogenic fluid which the system is intended to handle. For instance, carbon dioxide gas may be substituted for air in a closed environment around coherent aerogel. Upon cooldown of the system by a fluid at cryogenic temperature, such as liquid oxygen or nitrogen, that is, cooldown of the first lamina and a portion of the adjacent coherent aerogel, condensation of the carbon dioxide gas will occur, thereby reducing the pressure of the gaseous environment of the aerogel and reducing the rate of heat transmission across the aerogel. Analogously, if the cryogenic liquid is hydrogen or helium, air in the closed system will condense reducing the pressure of the gaseous environment of the aerogel and the rate of heat transmission across the aerogel.

An alternate method of achieving reduced pressure in a closed environment about coherent aerogel is to provide within the environment an amount of material which upon being cooled to cryogenic temperatures will adsorb gas from the closed environment. This method of achieving reduced pressures is particularly suitable for achieving the higher pressure ranges, as set out above, at which this inventive cryogenic system operates with low heat leak. As shown in FIG. 1, molecular sieve material in a reservoir 26 reentrant into the volume to be occupied by cryogenic fluid in the storage container will be cooled to cryogenic temperature upon filling of the container with cryogenic fluid. The molecular sieve material will then adsorb gas, thereby reducing the pressure in the closed environment surrounding the coherent aerogel.

Still another method of reducing the thermal conductivity of coherent aerogel in a gaseous environment, either at atmospheric pressure or subatmospheric pressure, is to replace air from the environment surrounding the aerogel with gas of lower thermal conductivity than air, such as argon, xenon, krypton, trichlorofluoromethane, dichlorodifluoromethane, bromine, carbon disulfide, sulfur hexafluoride or mixtures thereof. A gas or mixture of gases having a thermal conductivity at least 25% lower than that of air at thermal conduction pressures is effective.

Although the invention has been described with reference to specific embodiments, it will be appreciated that it is intended to cover all modifications and equivalents within the scope of the appended claims.

TABLE I

| Pressure, Micrometers of mercury | Thermal conductivity without radiation shields, watts/m K, 295K to 77K | Thermal conductivity with radiation shields at layer surfaces, watts/m K, 295K to 77K | Thermal conductivity without radiation shields, watts/m K, 330K to 300K |
|---|---|---|---|
| 7.5 | 0.00237 | | |
| 27 | | 0.00192 | |
| 28 | | | 0.00974 |
| 41 | 0.00346 | | |
| 43 | | 0.00246 | |
| 95 | | 0.00298 | |
| 200 | | 0.00334 | |
| 425 | | 0.00351 | |
| 550 | 0.00364 | | |
| 5000 | 0.00392 | 0.00384 | |
| 31000 | 0.00432 | | |
| 80000 | | | 0.0107 |
| 83000 | | 0.00497 | |
| 84000 | 0.00502 | | |
| 228000 | 0.00650 | | |
| 243000 | | 0.00675 | |
| 470000 | 0.00853 | | |
| 743000 | 0.01022 | | |

What is claimed is:

1. A low heat-leak cryogenic system comprising:
   (a) a cryogenic fluid;
   (b) a first lamina having an external side facing said cryogenic fluid and an internal side facing away from said cryogenic fluid;
   (c) a second lamina spaced apart from said internal side of said first lamina, said second lamina having an internal side facing toward said first lamina and an external side facing away from said first lamina; and
   (d) at least one block or layer of coherent aerogel having a density of about 20 kg/m³ to about 100 kg/m³ extending from said internal side of said first lamina to said internal side of said second lamina.

2. The system as in claim 1 further comprising about said aerogel a gaseous environment having a pressure of from about 300 to about 250,000 micrometers of mercury.

3. The system as in claim 1 further comprising about said aerogel a gaseous environment having a pressure of from about 1000 to about 250,000 micrometers of mercury.

4. The system as in claim 1 further comprising about said aerogel a gaseous environment having a pressure of from about 10,000 to about 250,000 micrometers of mercury.

5. The system as in claim 1 wherein said aerogel for colder regions between said first and second lamina has a larger pore size than said silica aerogel for warmer regions between said first and second lamina.

6. The system as in claim 1 wherein said aerogel for colder regions between said first and second lamina has a lower density than said aerogel for warmer regions between said first and second lamina.

7. The system as in claim 1 further comprising a closed environment around said aerogel and adsorbent for adsorbing gas from said closed environment upon cooldown of at least a portion of said closed environment to cryogenic temperature, whereby gaseous pressure in said environment is reduced thereby reducing the rate of heat transmission across said aerogel.

8. The system as in claim 1 wherein said aerogel is contained in a gaseous environment comprising a gas or mixture of gases having a thermal conductivity at least 25% lower than that of air at thermal conduction pressures, whereby the rate of transfer of heat across said aerogel is reduced relative to being contained in a gaseous environment comprising air.

9. The system as in claim 1 wherein said aerogel is contained in a gaseous environment comprising a gas or mixture of gases which condense at the temperature existing in said cryogenic fluid.

10. The system as in claim 1 wherein said aerogel is capable of transmitting an external load from one of said lamina to the other of said other lamina.

11. The system as in claim 1 wherein at least one of said lamina is flexible so as to transmit an external load to said aerogel, and said aerogel is capable of at least partially transmitting the load imposed on it from one of said lamina to the other of said lamina.

12. The system as in claim 1 further comprising localized load supporting means between said first and said second lamina.

13. The system as in claim 1 further comprising at least one radiation shield between said first and said second lamina.

14. The system as in claim 1 wherein said aerogel is in a form chosen from the group consisting of a panel, block, random pieces, aligned pieces, pellets, compressed powder, combinations of the preceding, or any of the preceding in combination with powder.

15. The system as in claim 1 wherein said lamina provide an enclosure around said aerogel against the entry of air and moisture, and as protection during handling.

16. The system as in claim 1 further comprising a protective coating or insulative coating on the external side of the second lamina.

17. The system as in claim 1 wherein said aerogel is chosen from the group consisting of silica aerogel, alumina aerogel, zirconia aerogel, carbon aerogel, boron aerogel, tungsten aerogel, titanium aerogel, aerogel made by the sol-gel polymerization of resorcinol with formaldehyde, and aerogel made by the sol-gel polymerization of melamine with formaldehyde.

18. The system as in claim 16 wherein said silica aerogel has an effective pore size in the range of from about 0.01 to about 0.4 micrometers.

19. The system as in claim 16 wherein said silica aerogel has an effective pore size in the range of from about 0.02 to about 0.1 micrometers.

20. A method for use of at least one block or layer of coherent aerogel in a low heat-leak cryogenic system, said method comprising:

(a) providing a first lamina having an external side facing said cryogenic fluid and an internal side facing away from said cryogenic fluid;

(b) providing a second lamina spaced apart from said internal side of said first lamina, said second lamina having an internal side facing toward said first lamina and an external side facing away from said first lamina; and (c) providing at least one block or layer of coherent aerogel having a density of about 20 kg/m$^3$ to about 100 kg/m$^3$ extending from said internal side of said first lamina to said internal side of said second lamina; and (d) providing about said aerogel a gaseous environment having a pressure not greater than about 250,000 micrometers of mercury.

* * * * *